United States Patent
Sato

(10) Patent No.: US 6,883,976 B2
(45) Date of Patent: Apr. 26, 2005

(54) OPTICAL FIBER FERRULE ASSEMBLY AND OPTICAL MODULE AND OPTICAL CONNECTOR USING THE SAME

(75) Inventor: Tsuguo Sato, Soka (JP)

(73) Assignee: Seikoh Giken Co., Ltd., Matsudo (JP)

( * ) Notice: Subject to any disclaimer, the term of this patent is extended or adjusted under 35 U.S.C. 154(b) by 152 days.

(21) Appl. No.: 09/983,807

(22) Filed: Oct. 25, 2001

(65) Prior Publication Data

US 2003/0021546 A1 Jan. 30, 2003

(30) Foreign Application Priority Data

Jul. 30, 2001 (JP) .................................. 2001-229090

(51) Int. Cl.$^7$ .............................................. G02B 6/36
(52) U.S. Cl. .......................................... 385/78; 385/80
(58) Field of Search .............................. 385/80, 78, 81, 385/84, 86

(56) References Cited

U.S. PATENT DOCUMENTS

| | | | | |
|---|---|---|---|---|
| 4,762,389 A | * | 8/1988 | Kaihara | 385/60 |
| 4,799,759 A | * | 1/1989 | Balyasny | 385/66 |
| 5,052,774 A | * | 10/1991 | Bulman et al. | 385/86 |
| 5,390,270 A | * | 2/1995 | Hanzawa et al. | 385/81 |
| 5,774,613 A | * | 6/1998 | Tanabe et al. | 385/84 |
| 5,790,732 A | * | 8/1998 | Ueda | 385/84 |
| 5,841,922 A | * | 11/1998 | Iwatsuka et al. | 385/76 |
| 5,858,161 A | * | 1/1999 | Nakajima et al. | 156/293 |
| 6,190,055 B1 | * | 2/2001 | Andersen | 385/80 |
| 6,238,103 B1 | * | 5/2001 | Ezawa | 385/81 |
| 2001/0036341 A1 | * | 11/2001 | Ohtsuka et al. | 385/78 |
| 2002/0090179 A1 | * | 7/2002 | Iwano et al. | 385/78 |
| 2002/0146214 A1 | * | 10/2002 | Tanaka et al. | 385/78 |

* cited by examiner

*Primary Examiner*—Frank G. Font
*Assistant Examiner*—Eric Wong
(74) *Attorney, Agent, or Firm*—Venable LLP; Michael A. Sartori; Daniel G. Vivarelli, Jr.

(57) ABSTRACT

In an optical fiber ferrule assembly, a bare optical fiber, an end coating of which is removed, is inserted and fixed into the central hole of a ferrule body. By setting the distance between a boundary point at which the bare optical fiber is fixed at the rear end of the ferrule body and a next point at which the bare optical fiber is fixed to a fixing member which is formed integrally with the ferrule body via a coating of an optical fiber core to the range of 0.5 to 6 mm, more preferably, to the range of 1 to 4 mm, stress concentration at the boundary point at which the bare optical fiber is bonded and the point at which the optical fiber core is fixed cab be reduced.

3 Claims, 5 Drawing Sheets

OPTICAL FIBER FERRULE ASSEMBLY AND OPTICAL MODULE AND OPTICAL CONNECTOR USING THE SAME

BACKGROUND OF THE INVENTION

1. Field of the Invention

The present invention relates to an optical fiber ferrule assembly capable of improving drawing strength of an optical fiber, and relates to an optical connector and an optical module using the same.

2. Description of the Related Art

Referring now to FIGS. 9–11 a ferrule assembly used in an optical connector, an optical module, an optical measuring instrument, and the like is configured in such a manner that a fixing member 4 is formed integrally with a ferrule body 7 having a tapered hole, with a diameter that is larger towards the rear end to guide the insertion of a bare optical fiber 1, into which the bare optical fiber 1 and a jacketed optical fiber (optical fiber core) 8 are inserted and fixed, respectively. In the conventional ferrule assembly, the fixing member 4 is filled with an adhesive 9 in advance, and the bare optical fiber 1, an end coating of which is removed, is inserted into a central hole 5 thereof until a coating layer of the jacketed optical fiber 8 following the bare optical fiber 1 comes into contact with the ferrule body 7. After the insertion, the adhesive 9 is cured, thereby bonding the bare optical fiber 1 and the jacketed optical fiber 8.

However, in an optical connector and an optical module using the conventional optical fiber ferrule assembly manufactured in such a way, when tensile stress is applied thereto during service, the optical fiber is broken and is come out by a small tensile stress of about 0.5 kgf. The causes of such a break of the fiber could be as follows:

(1) When inserting the optical fiber into the ferrule body, the optical fiber is damaged.

(2) When the tensile stress is applied, some portions are subjected to stress concentration, thereby breaking the optical fiber.

With regard to (1), since the assembly is manufactured in such a way that after the adhesive 9 has been charged, the fiber is then inserted, it is conceivable that the possibility of (1) may be small. On the other hand, as for the cause (2), it is conceivable that a local stress may be applied to a boundary point at which the optical fiber is bonded or a boundary point at which the jacketed optical fiber is bonded due to an eccentricity of the central hole 5 of the ferrule body 7 or an eccentricity of the jacketed optical fiber (fiber core) 8, thereby causing the optical fiber to be bent. In general, while the eccentricity of the central hole 5 is as small as 1.5 an or less, the accuracy of the inside diameter of a central hole (insertion hole) of the fixing member 4 is about tens of ems, and the eccentricity of the jacketed optical fiber 8 is also about tens of ems. Accordingly, it is possible that the eccentricity of the optical fiber with respect to the ferrule body 7 exceeds 100 µm.

Thus, in order to determine whether or not the eccentricity has a bearing on the cause of a decrease in the drawing strength of the optical fiber, the optical fiber ferrule assembly of a product group having a small drawing strength is polished in parallel with the optical axis until the bonded optical fiber 1 is exposed, and a state of enclosing the optical fiber 1 into the ferrule body 7 and the fixing member 4 with a flange is observed in detail by a microscope.

As a result, the optical fiber 1 is bent at a boundary point $A_1$ where the optical fiber 1 is bonded to the ferrule body 7 and a boundary point $B_1$ where the optical fiber 1 is bonded to the jacketed optical fiber 8, as shown in FIG. 11, and the state thereof agrees with the state of the optical fiber in the optical fiber ferrule assembly in which the optical fiber is broken and drawn out. Consequently, it is found that a main cause of a decrease in drawing strength, that is, a main cause of the break is stress concentration at the boundaries, particularly, at point $A_1$.

SUMMARY OF THE INVENTION

Accordingly, it is an object of the present invention to provide an optical fiber ferrule assembly capable of reducing variations and preventing the break of the optical fiber due to stress concentration at adhesion boundaries $A_1$ and $B_1$ and ensuring drawing strength of 1 kgf or more, more preferably, 2 kgf or more, and to provide an optical module and optical connector using the same.

In order to achieve the above objects, an optical fiber ferrule assembly according to the present invention includes an optical fiber ferrule member into which a bare optical fiber, the jacket of which is removed, is inserted and fixed into the central hole of a ferrule body, and a fixing member which is integrally connected to the ferrule body and for fixing an inserted jacketed fiber connecting to the bare optical fiber, wherein, the distance between a boundary point at which the bare optical fiber is inserted and fixed at the rear end of the central hole of the ferrule body and a boundary point at which the jacketed fiber is bonded is within the range of 0.5 to 6 mm.

In the optical fiber ferrule assembly according to the present invention, the distance between the boundary point at which the bare optical fiber is inserted and fixed and the boundary point at which the jacketed fiber is bonded is within the range of 1 to 4 mm.

In the optical fiber ferrule assembly according to the present invention, the fixing member for inserting and fixing the jacketed fiber is a tube-shaped fixing member.

In the optical fiber ferrule assembly according to the present invention, the fixing member for inserting and fixing the jacketed fiber is a flanged fixing member.

In the optical fiber ferrule assembly according to the present invention, a collar for adjusting the distance between the rear end of the ferrule body and the boundary point at which the jacketed fiber is fixed to a predetermined length is disposed between the rear end of the ferrule body and the boundary point at which the jacketed fiber is fixed.

In the optical fiber ferrule assembly according to the present invention, the ferrule body is provided with a gap-adjusting hole having a diameter which is larger than the outside diameter of the bare optical fiber and which is smaller than the outside diameter of the jacketed fiber and having a length of 0.5 to 6 mm from the rear end to the front end thereof.

In an optical module according to an embodiment of the present invention, the optical fiber ferrule assembly used is the basic optical of fiber ferrule assembly according to the invention described above with a tube shaped fixing member.

The optical module according to the present invention may additionally have either a collar disposed between the rear end of the ferrule body and the boundary point at which the jacketed fiber is fixed or bonded to adjust the distance there between, or the ferrule body is provided a gap adjusting hole having a diameter which is larger than the outside diameter of the bare optical fiber and which is smaller than the outside diameter of the jacketed fiber and having a length of 0.5 to 6 mm from the rear end to the front end thereof.

In an optical connector according to the present invention, the optical fiber ferrule assembly used is the basic optical ferrule assembly described above with a flanged fixing member.

The optical connector according to the present invention likewise may have additionally either a collar disposed between the rear end of the ferrule body and the boundary point at which the jacketed fiber is fixed or bonded to adjust the distance there between, or the ferrule body is provided a gap adjusting hole having a diameter which is larger than the outside diameter of the bare optical fiber and which is smaller than the outside diameter of the jacketed fiber and having a length of 0.5 to 6 mm from the rear end to the front end thereof.

DESCRIPTION OF THE PREFERRED EMBODIMENTS

Embodiments of the present invention will be described hereinbelow with reference to the drawings.

Figure 1:
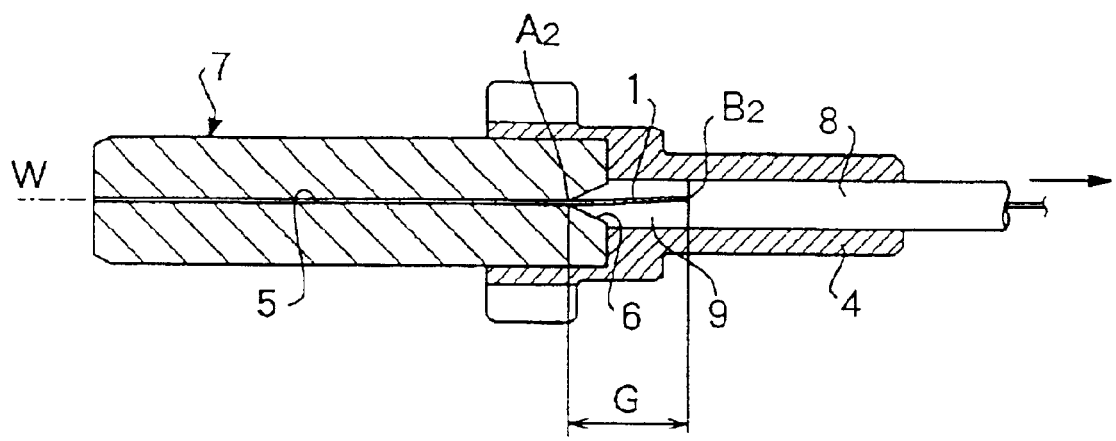
FIG. 1 is a sectional view of an optical fiber ferrule assembly according to the present invention for explaining the principle thereof.
Figure 12A:
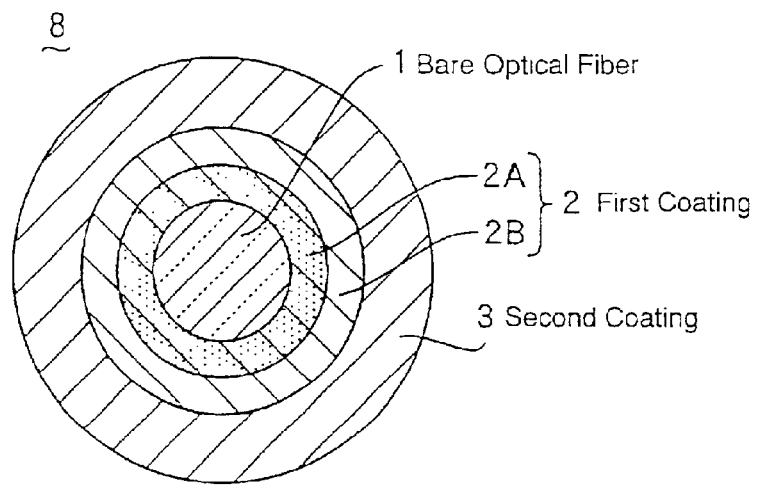
FIG. 12A is an enlarged cross sectional view of a glass optical fiber core.
Figure 12B:
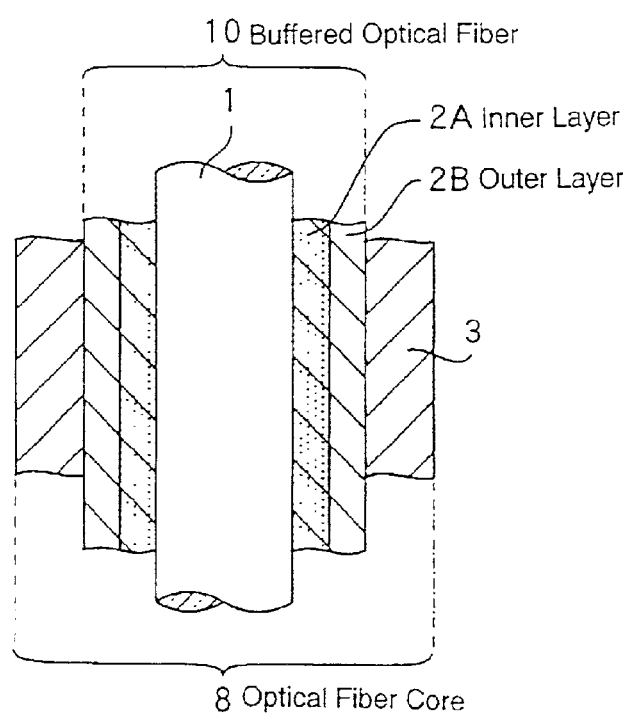
FIG. 12B is an enlarged longitudinal sectional view of the glass optical fiber core.

FIG. 1 is a schematic sectional view of an optical fiber ferrule assembly according to the present invention for explaining the fundamentals of the structure. The optical fiber ferrule assembly includes a ferrule body 7 having a central hole 5 for inserting and fixing a bare optical fiber 1, and a flanged fixing member 4, which is fixed integrally with the ferrule body 7 and for receiving and fixing an optical fiber core 8 connected to the bare optical fiber 1 which is inserted and fixed to the ferrule body 7. FIG. 12 specifically illustrates the configuration of the optical fiber core 8. The central hole 5 of the ferrule body 7 is filled with an adhesive such as an epoxy-resin based adhesive, into which the bare optical fiber 1 is inserted, a predetermined length of the end coating of which being removed, the optical fiber core 8 is inserted into the central hole of the fixing member 4, and they are bonded, respectively.

In this optical fiber ferrule assembly, by varying the distance (a gap G) between $A_2$ and $B_2$, at which the bare optical fiber 1 are bent, that is, the distance between a boundary point $A_2$ (a point at which the diameter decreases towards a rear end) on the rear end side of the central hole 5 into which the bare optical fiber 1 is inserted and fixed and a boundary point $B_2$ at which a jacketed optical fiber (fiber core) 8 is adhered, the effect of the gap G on drawing strength was examined. In the experiment, the ferrule body 7 in which the distance (the length of increased diameter portion) between point $A_2$ (a point at which the diameter increases towards the rear end) and the rear end of the ferrule body 7 is 0.3 mm is used.

Figure 2:
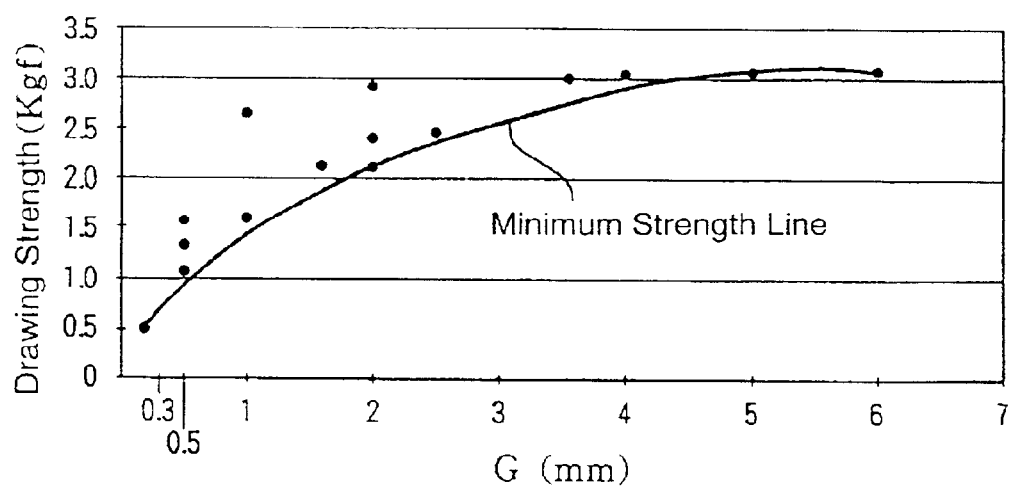
FIG. 2 is a graph illustrating the relationship between the length G of a gap and drawing strength in the optical fiber ferrule assembly shown in FIG. 1.

The result of the above experiment is shown in FIG. 2. As is evident from the drawing, the drawing strength is steeply increased to 1 kgf or more with the gap G of 0.5 mm, and becomes saturated to about 3 kgf with the gap G of about 4 mm. Accordingly, it is found that in order to obtain drawing strength of 1 kgf or more, it is necessary to set the gap G to 0.5 mm or more, to obtain drawing strength of 1.5 kgf or more, it is necessary to set the gap G to 1 mm or more, and to obtain drawing strength of 2 kgf or more, it is necessary to set the gap G to 2 mm or more.

However, when the gap G is increased, adhesive strength between the optical fiber core 8 and the fixing member 4 is decreased when the length of the fixing member 4 is short. Accordingly, it is preferable that the gap G be 6 mm or less, and more preferably, it is 4 mm or less.

Embodiments

Embodiments of the ferrule assembly according to the present invention will be described hereinbelow with reference to the drawings.

Figure 5:
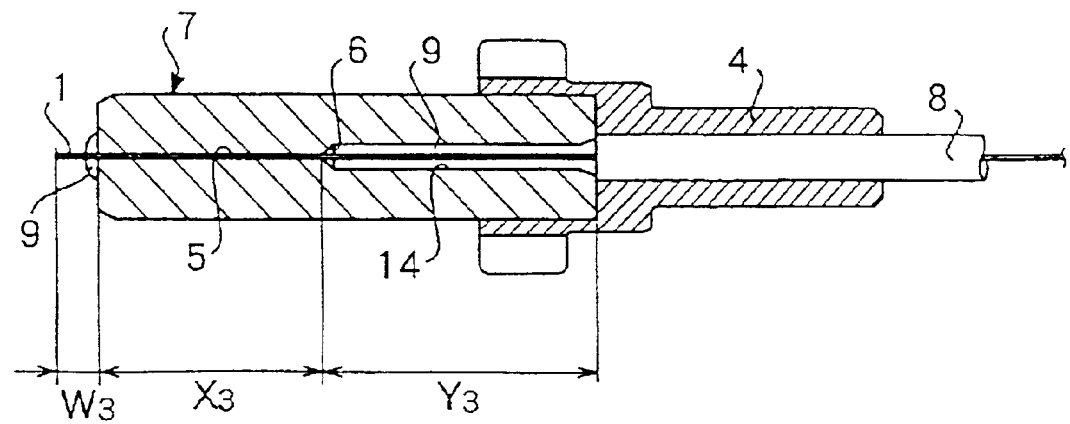
FIG. 5 is a sectional view showing a third embodiment of the optical fiber ferrule assembly according to the present invention.
Figure 6:
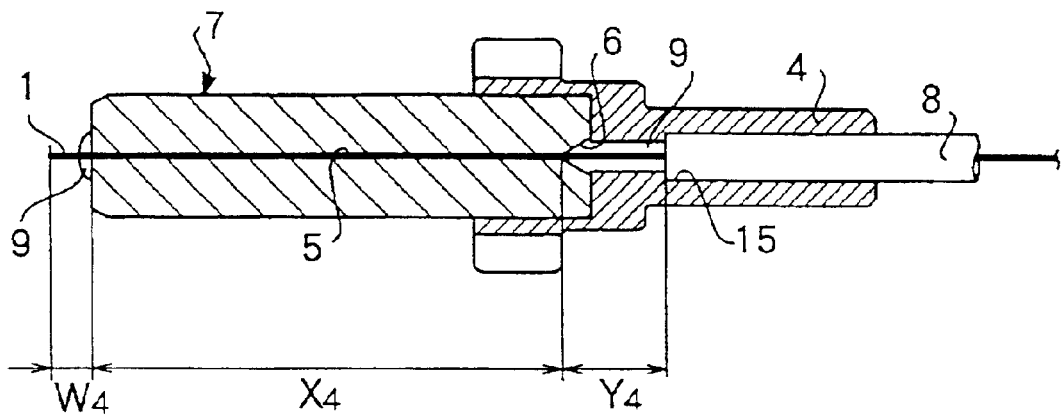
FIG. 6 is a sectional view showing a fourth embodiment of the optical fiber ferrule assembly according to the present invention.
Figure 7:
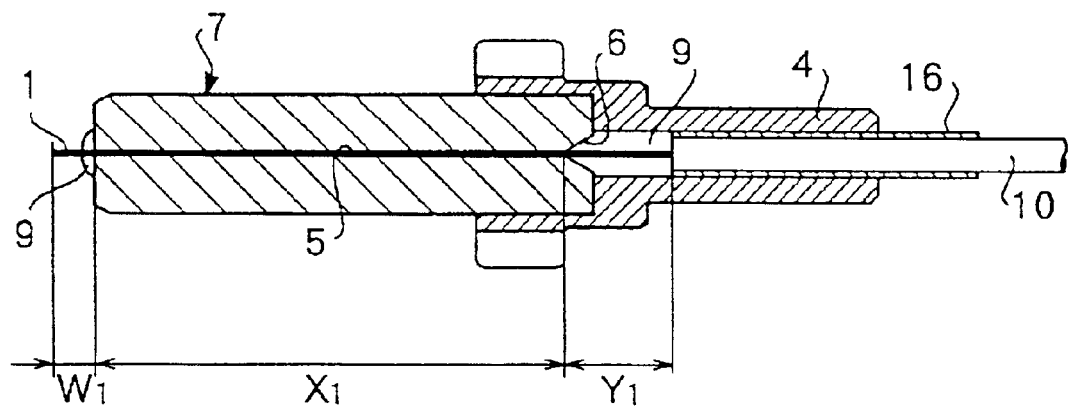
FIG. 7 is a sectional view showing a fifth embodiment of the optical fiber ferrule assembly according to the present invention.
Figure 8:
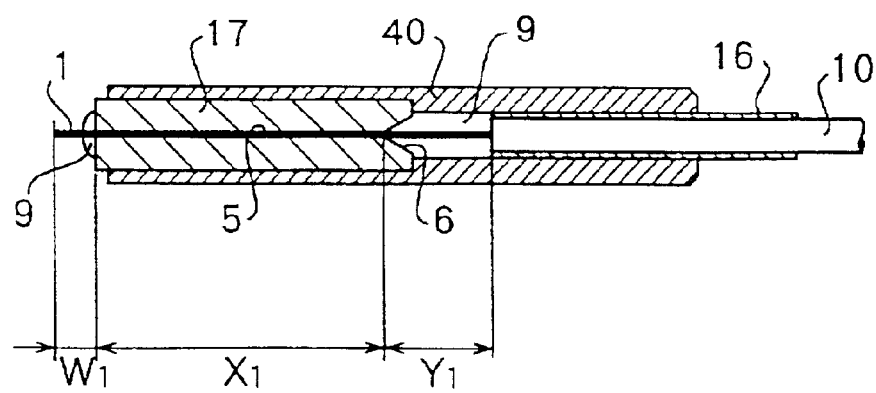
FIG. 8 is a sectional view showing a sixth embodiment of the optical fiber ferrule assembly according to the present invention.
Figure 9:
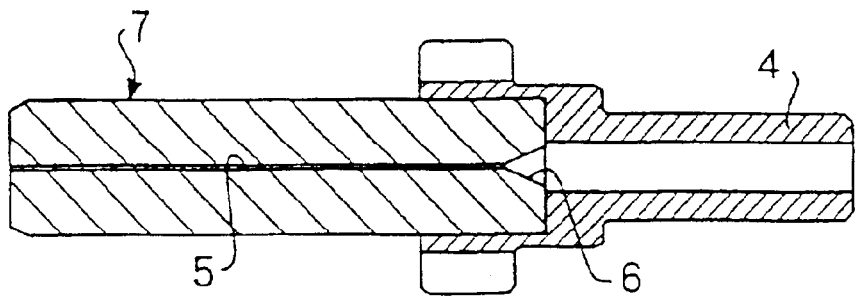
FIG. 9 is a sectional view showing a conventional ferrule assembly by connecting a common ferrule body and a fixing member.
Figure 10:
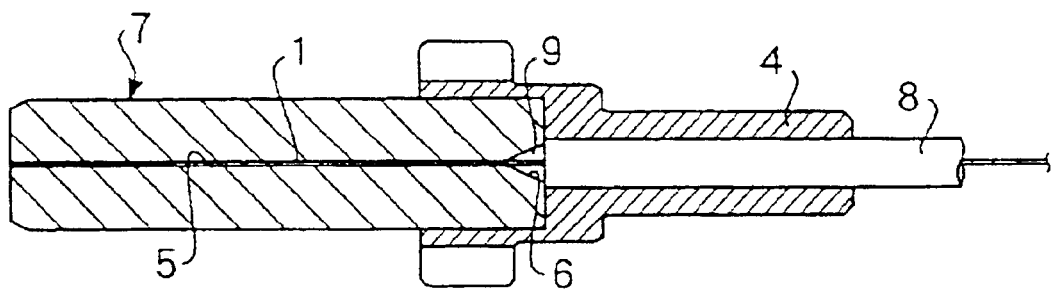
FIG. 10 is a sectional view showing a state (an ideal connection state) in which an optical fiber is connected to the ferrule assembly shown in FIG. 9 without eccentricity.
Figure 11:
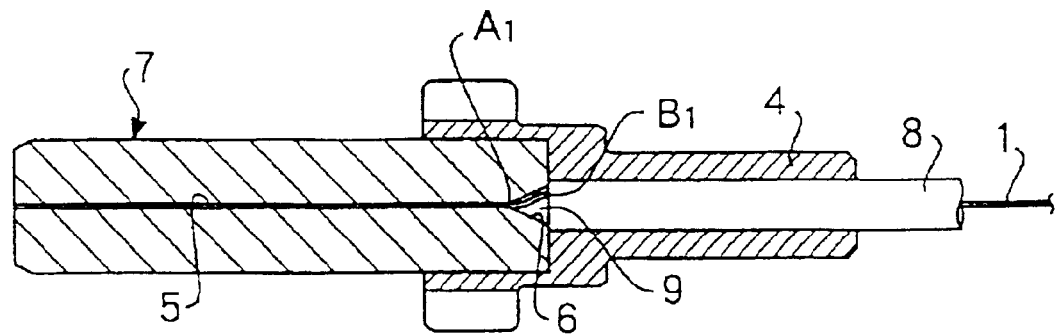
FIG. 11 is a sectional view showing a state (an undesired connection state) in which an optical fiber is connected to the ferrule assembly shown in FIG. 9 with eccentricity.

Prior to describing each embodiment, elements which form the assemblies shown in FIGS. 3, 4, 5, 6, 7, and 8 will be described. The ferrule body 7 shown in FIGS. 5 to 7 is made of zirconium, and has an outside diameter of 2.5 mm, a length of 16 mm, and a central hole of 126 to 127 $\mu$m in diameter. A ferrule body 17 shown in FIG. 8 is made of zirconium, and has an outside diameter of 1.5 mm, a length of 3 mm, and a central hole of 126 to 127 $\mu$m in diameter. Each fixing member 4 is made of metal, and those shown in FIGS. 3 to 5 and FIG. 7 are flanged fixing members each provided with an insertion hole having an inside diameter of 2.5 mm for receiving the ferrule body 7 at the front end thereof and a shoulder type hole having an inside diameter of 1 mm at the rear end.

The fixing member 4 shown in FIG. 6 is a flanged fixing member which is provided with an insertion hole having an inside diameter of 2.5 mm for receiving the ferrule body 7 at the front end thereof, and in which a gap adjusting hole having a diameter smaller than the outside diameter of the optical fiber core 8 and a shoulder type hole having an inside diameter of 1 mm for inserting the optical fiber core 8 are connected at the rear end. A fixing member 40 shown in FIG.

8 is a sleeve-type fixing member which is provided with an insertion hole having an inside diameter of 1.5 mm for receiving a ferrule body 17 having an outside diameter of 1.5 mm which is smaller than the ferrule body 7 at the front end thereof, and a shoulder type hole having an inside diameter of 1 mm at the rear end.

The optical fiber core 8 shown in FIG. 1 and FIGS. 3 to 6 has an outside diameter of 0.9 mm, and is formed in such a manner that the bare optical fiber 1 of 125 μm in diameter is given a first coating 2 for protecting the fiber to form a buffered fiber having an outside diameter of 0.25 mm, and to which a second coating 3 serving as a buffer layer for an external pressure or the like. A buffered optical fiber 10 shown in FIGS. 7 and 8 has an outside diameter of 0.4 mm in which a first coating 2B in FIG. 12 is thickly formed.

The optical fiber ferrule assembly according to each embodiment will be described hereinbelow.

Figure 3:
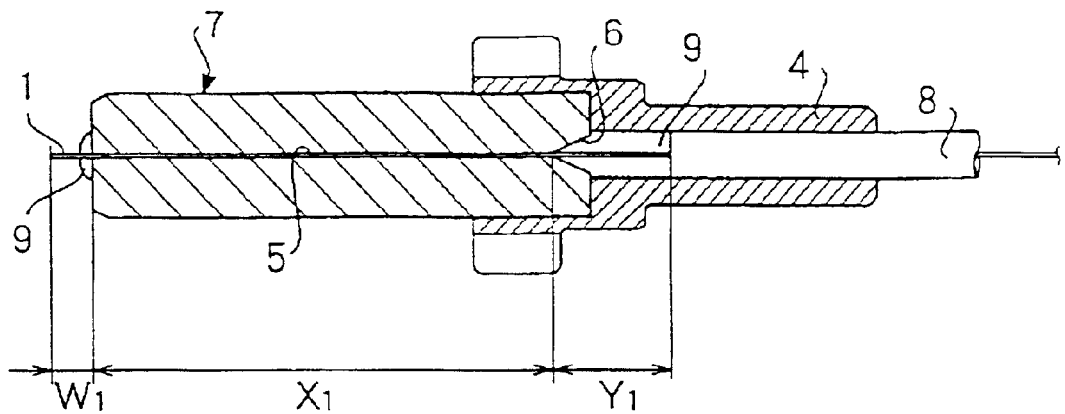
FIG. 3 is a sectional view showing a first embodiment of the optical fiber ferrule assembly according to the present invention.

FIG. 3 is a sectional view showing a first embodiment of the optical fiber ferrule assembly according to the present invention. The second coating 3 at the end of the optical fiber core 8 and the first coating 2, that is, a coating layer, are removed by 14 mm, that is, the length of $(W_1+X_1+Y_1)$ to expose the bare optical fiber 1. Reference numeral $W_1$ denotes the length of a portion projecting from the end of the ferrule body 7, reference numeral $X_1$ denotes the length of a portion of the bare optical fiber 1, which corresponds to the optical fiber insertion hole 5, and reference numeral $Y_1$ denotes the length corresponding to the gap G. The epoxy-resin based adhesive 9 is charged into the inside of the fixing member 4 from the rear end thereof in advance. Next, the exposed end of the bare optical fiber 1 is inserted and pressed thereto until the optical fiber core 8 enters the inside of the fixing member 4, and is stopped at a position where the end of the bare optical fiber 1 projects from the ceramic ferrule body 7 by 2 mm which corresponds to the length $W_1$, thereby ensuring the length $Y_1$ of the gap. Subsequently, the bare optical fiber 1 is secured to the bare optical fiber insertion hole 5 of the ferrule body 7 and a taper portion 6, and the gap G and the optical fiber core 8 are secured to the fixing member 4, respectively, by heating and curing the adhesive 9. The bare optical fiber 1 projecting from the ferrule body 7 by the length $W_1$ is removed by cutting or polishing, and the end of the ferrule body 7 is then polished, thereby manufacturing the optical fiber ferrule assembly.

Figure 4:
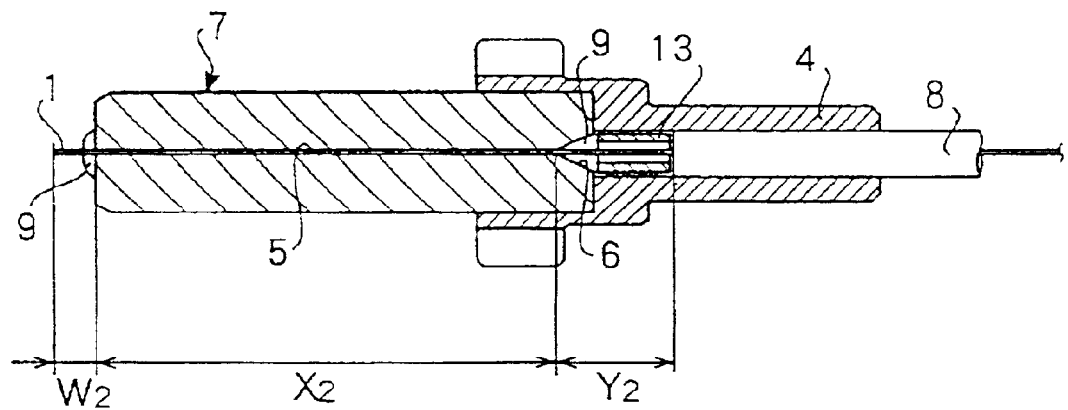
FIG. 4 is a sectional view showing a second embodiment of the optical fiber ferrule assembly according to the present invention.

FIG. 4 is a sectional view showing a second embodiment of the optical fiber ferrule assembly according to the present invention. In this embodiment, the optical fiber ferrule assembly receives the bare optical fiber 1, and in which a collar 13 having a length of G is placed between the end of the ferrule body 7 and the end of the optical fiber core 8. In the first embodiment shown in FIG. 3, the length $Y_1$ of the gap is adjusted by the length $W_1$ of the bare optical fiber 1 projecting from the end of the ferrule body 7.

In the second embodiment, the length $Y_1$ is accurately determined by the collar 13. The collar 13 has a pipe shape and has an inside diameter of 0.3 mm which is larger than the outside diameter of the bare optical fiber 1, an outside diameter of 0.8 mm which is smaller than that of the optical fiber core 8, and a length of 3 mm. The collar 13 is made of metal, however, it is not particularly specified as long as it is made of a material, such as glass, ceramic, or plastic, which may not be damaged by the adhesive 9.

According to the first embodiment, the second coating 3 and the first coating 2 at the end of the optical fiber core 8 are removed by 15 mm, that is, the length of $(W_2+X_2+Y_2)$ to expose the bare optical fiber 1. Subsequently, after the collar 13 has been inserted into the bare optical fiber 1, the optical fiber core 8 is inserted into the fixing member 4 which is filled with the adhesive 9 in advance. Accordingly, the length $Y_2$ of the gap=3 mm is determined without checking the length $W_2$ of the projection. Since the configuration is basically the same as that of the first embodiment, a remaining description thereof will be omitted.

FIG. 5 is a sectional view showing a third embodiment of the optical fiber ferrule assembly according to the present invention. In this embodiment, the optical fiber ferrule assembly is provided with a gap-adjusting hole 14 having a diameter which is larger than the outside diameter of the bare optical fiber 1 and is smaller than the outside diameter of the optical fiber core 8 from the rear end of the central hole 5 of the ferrule body 7 to the rear end of the ferrule body 7. By varying the length of the gap-adjusting hole 14, the same effect as that of the gap in the above embodiments can be obtained.

In order to easily insert the bare optical fiber 1, the bare optical fiber insertion hole 5 and the gap-adjusting hole 14 are connected together via the taper section 6. According to the first embodiment, the second coating 3 and the first coating 2 at the end of the optical fiber core 8 are removed by 12 mm, that is, the length of $(W_3+X_3+Y_3)$ to expose the bare optical fiber 1. Subsequently, the bare optical fiber core 1 is inserted into the fixing member 4 which is filled with the adhesive 9 in advance until the optical fiber core 8 comes into contact with the ferrule body 7. Next, the bare optical fiber 1 is bonded to the ferrule body 7 and the optical fiber core 8 is fixed to the fixing member 4, respectively, by heating and curing the adhesive 9. After that, the section of the ferrule body 7 is polished as in the first embodiment, thereby manufacturing the optical fiber ferrule assembly.

FIG. 6 is a sectional view showing a fourth embodiment of the optical fiber ferrule assembly according to the present invention. In this embodiment, in order to adjust the gap, a core stop step 15 for stopping the insertion of the optical fiber core 8 is provided at the inner surface of the flanged fixing member 4. Accordingly, the length $Y_4$ of the gap is determined. According to the first embodiment, the second coating 3 and the first coating 2 at the end of the optical fiber core 8 are removed by 16 mm, that is, the length of $(W_4+X_4+Y_4)$ to expose the bare optical fiber 1. Next, the bare optical fiber 1 is inserted into the fixing member 4 which is filled with the adhesive 9 in advance until the optical fiber core 8 comes into contact with the core stop step 15. Subsequently, the bare optical fiber 1 is bonded to the bare optical fiber insertion hole 5 of the ferrule body 7 and to a portion from the ferrule body 7 to the core stop step 15, and the optical fiber core 8 is fixed to the fixing member 4, respectively, by heating and curing the adhesive 9. After that, the end of the ferrule body 7 is polished as in the first embodiment, thereby manufacturing the optical fiber ferrule assembly.

FIG. 7 is a sectional view showing a fifth embodiment of the optical fiber ferrule assembly according to the present invention. In the optical fiber ferrule assembly of this embodiment, the optical fiber is fixed to the flanged fixing member 4 using a buffered-optical-fiber protection tube 16. As an optical fiber, the buffered optical fiber 10 having an outside diameter of 0.4 mm, in which the first coating 2B is thickly coated on the bare optical fiber 1, is used instead of the optical fiber core 8. In order to prevent the buffered optical fiber 10 from bending at the rear end of the flanged fixing member, it is covered by the buffered-optical-fiber protection tube 16 having an outside diameter of 0.9 mm and an inside diameter of 0.5 mm, and which is made of PVC (polyvinyl chloride). Of course, the buffered optical fiber 10 having the buffered-optical-fiber protection tube 16 covered thereon exhibits the same effect on improving the performance as the other embodiments using the optical fiber core 8. Drawing strength is improved by providing the gap as in FIG. 2.

FIG. 8 is a sectional view showing a sixth embodiment of the optical fiber ferrule assembly according to the present invention. The fixing member 40 of this embodiment receives a ferrule body 17 having an outside diameter of 1.5 mm, an central hole of 126 to 127 μm in diameter, and a length of 3 mm at one end thereof, and holds the buffered optical fiber 10 having an outside diameter of 0.4 mm via the buffered-optical-fiber protection tube 16 at the inner periphery of the other end, as in the fifth embodiment. In other words, in this embodiment, the fixing member 40 receives and holds the buffered optical fiber 10 as a holding member, and also holds almost the entire length of the ferrule body 17.

As in the above embodiments, the distance $Y_1$ from the boundary point at which the bare optical fiber 1 is bonded at the rear end of the ferrule body 17 to the fixing point of the jacketed portion is set to 0.5 to 6 mm, more preferably, is set to 1 to 4 mm.

Consequently, minimum drawing strength can be maintained at about 1 to 3 kgf, as in the case of using the flanged fixing member. Also, the ferrule body 17 and the fixing member 40 can be integrally formed of the same material such as metal.

In the embodiment shown in FIG. 8, the ferrule assembly includes the fixing member 40 made of stainless steel and the ferrule body 17 which is inserted and fixed to one end thereof. Also, the fixing member 40 may be provided with a step for setting the front end of the jacketed portion (buffered optical fiber 10), the front end of the optical fiber core 8, or the front end of the buffered-optical-fiber protecton tube 16, thereby obtaining a predetermined gap. In the optical fiber ferrule assemblies of the above embodiments obtained as described above, the relationship between the gap and the drawing strength of the optical fiber was studied. As a result, it is found that a similar effect to that of FIG. 2 can be obtained.

The present invention is not limited to the above embodiments, but many modifications are possible within the spirit and the scope of the present invention.

As specifically described, since the optical fiber ferrule assembly according to the present invention is provided with a gap having a predetermined length between a boundary point of the ceramic ferrule body to which the bare optical fiber is bonded and a boundary point at which a coating of the optical fiber core is bonded, there is no problem in that the optical fiber is bent and subjected to a large local stress at the boundary point at which the bare optical fiber is bonded and at the boundary point at which the optical fiber core is bonded due to eccentricity of the optical fiber core or a variation in the inside diameter of the fixing member, so that the optical fiber is broken and drawing strength is reduced. Consequently, even when the optical fiber ferrule assembly according to the present invention is used for an optical module or an optical connector, the optical fiber is not broken by tensile stress while it is used, so that it can be used for a long period with stability.

What is claimed is:

1. An optical fiber ferrule assembly comprising:

an optical fiber ferrule body into which a bare optical fiber, the jacket of which is removed, is inserted and fixed into the central hole of the ferrule body;

a fixing member, which is integrally connected to the ferrule body, for fixing an inserted jacketed fiber connected to the bare optical fiber, wherein the distance between a boundary point at which the bare optical fiber is inserted and fixed at the rear end of the central hole of the ferrule body and a boundary point at which the jacketed fiber is fixed covers a length of 0.5 to 6 mm; and a collar for adjusting the distance between the rear end of the ferrule body and the boundary point at which the jacketed fiber is fixed to a predetermined length placed between the rear end of the ferrule body and the boundary point at which the jacketed fiber is fixed.

2. An optical module comprising:

an optical fiber ferrule assembly comprising:

an optical fiber ferrule body into which a bare optical fiber, the jacket of which is removed, is inserted and fixed into the central hole of the ferrule body, and a fixing member, which is integrally connected to the ferrule body, for fixing an inserted jacketed fiber connected to the bare optical fiber, wherein the distance between a boundary point at which the bare optical fiber is inserted and fixed at the rear end of the central hole of the ferrule body and a boundary point at which the jacketed fiber is fixed covers a length of 0.5 to 6 mm, and wherein the fixing member for inserting and fixing the jacketed fiber is a tube-shaped fixing member; and a collar for adjusting the distance between the rear end of the ferrule body and the boundary point at which the jacketed fiber is fixed to a predetermined length is placed between the rear end of the ferrule body and the boundary point at which the jacketed fiber is fixed.

3. An optical connector comprising:

an optical fiber ferrule assembly comprising:

an optical fiber ferrule body into which a bare optical fiber, the jacket of which is removed, is inserted and fixed into the central hole of the ferrule body, and a fixing member, which is integrally connected to the ferrule body, for fixing an inserted jacketed fiber connected to the bare optical fiber, wherein the distance between a boundary point at which the bare optical fiber is inserted and fixed at the rear end of the central hole of the ferrule body and a boundary point at which the jacketed fiber is fixed covers a length of 0.5 to 6 mm, and wherein the fixing member for inserting and fixing the jacketed fiber is a flanged fixing member; and a collar for adjusting the distance between the rear end of the ferrule body and the boundary point at which the jacketed fiber is fixed to a predetermined length is placed between the rear end of the ferrule body and the front boundary at which the jacketed fiber is fixed.

* * * * *